United States Patent
Shamasundar (10) Patent No.: US 10,157,617 B2
(45) Date of Patent: Dec. 18, 2018

(54) SYSTEM AND METHOD FOR RENDERING AN AIRCRAFT COCKPIT DISPLAY FOR USE WITH ATC CONDITIONAL CLEARANCE INSTRUCTIONS

(71) Applicant: HONEYWELL INTERNATIONAL INC., Morris Plains, NJ (US)

(72) Inventor: Raghu Shamasundar, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 58 days.

(21) Appl. No.: 15/466,132

(22) Filed: Mar. 22, 2017

(65) Prior Publication Data
US 2018/0277116 A1   Sep. 27, 2018

(51) Int. Cl.
- *G10L 15/26* (2006.01)
- *G08G 5/00* (2006.01)
- *B64D 43/00* (2006.01)

(52) U.S. Cl.
CPC ............ *G10L 15/265* (2013.01); *B64D 43/00* (2013.01); *G08G 5/0013* (2013.01)

(58) Field of Classification Search
CPC . G10L 15/265; G10L 2015/223; G10L 15/22; G10L 17/22; B64D 43/00; G08G 5/0013; G06F 17/27; G06F 17/30554
USPC .......... 340/971, 945; 701/14; 342/29, 33, 36
See application file for complete search history.

(56) References Cited

U.S. PATENT DOCUMENTS

| | | | |
|---|---|---|---|
| 6,867,711 B1 | 3/2005 | Langner et al. | |
| 7,177,731 B2 | 2/2007 | Sandell et al. | |
| 7,363,119 B2 | 4/2008 | Griffin, III et al. | |
| 8,068,038 B2 | 11/2011 | Engels et al. | |
| 9,266,621 B2 | 2/2016 | Polansky et al. | |
| 9,446,852 B2 | 9/2016 | Lacko et al. | |
| 9,830,910 B1* | 11/2017 | Shapiro | G10L 15/265 |
| 2005/0203676 A1 | 9/2005 | Sandell et al. | |

(Continued)

FOREIGN PATENT DOCUMENTS

| | | |
|---|---|---|
| EP | 2568256 A2 | 3/2013 |
| EP | 3128500 A2 | 2/2017 |

OTHER PUBLICATIONS

Honeywell Aerospace Advance Technology; CPDLC Procedures; Contract No. DTFAWA-10-A-80031; Document No. DTFAWA-10-A-80031-MYY-01-ZZ; Rev2.

(Continued)

*Primary Examiner* — Omar Casillashernandez
(74) *Attorney, Agent, or Firm* — Lorenz & Kopf, LLP (57) ABSTRACT

A method for providing a flight display to an aircrew of an ownship aircraft includes receiving, at a radio communications module of the ownship aircraft, a voice transmission on an air traffic control first radio frequency from an air traffic controller, the voice transmission comprising a conditional clearance, wherein the condition clearance comprises a condition instruction and a clearance instruction, transcribing, using voice recognition software installed on the ownship aircraft, the voice transmission into an electronic, textual format, thereby generating a digital transmission record, and automatically, displaying, on a display device of the ownship aircraft, the condition instruction using a multi-format symbology and in a multi-step sequence over time, and waiting for and detecting an aircrew input corresponding to the clearance.

9 Claims, 9 Drawing Sheets

(56) References Cited

U.S. PATENT DOCUMENTS

| | | | |
|---|---|---|---|
| 2011/0264313 A1* | 10/2011 | Sampath | G08G 5/0013 701/16 |
| 2013/0226376 A1* | 8/2013 | Shamasundar | G08G 5/0021 701/14 |
| 2015/0084794 A1 | 3/2015 | Aymeric et al. | |
| 2015/0162001 A1* | 6/2015 | Kar | G08G 5/0013 704/235 |
| 2016/0125744 A1* | 5/2016 | Shamasundar | G08G 5/0039 701/122 |
| 2016/0161283 A1 | 6/2016 | Shamasundar et al. | |

OTHER PUBLICATIONS

Extended EP Search Report for Application No. 18162391.9 dated Aug. 22, 2018.

* cited by examiner

SYSTEM AND METHOD FOR RENDERING AN AIRCRAFT COCKPIT DISPLAY FOR USE WITH ATC CONDITIONAL CLEARANCE INSTRUCTIONS

TECHNICAL FIELD

The present disclosure generally relates to aircraft flight display technologies suitable for implementation in the cockpit of an aircraft. More particularly, the present disclosure relates to methods for displaying the conditional clearance instructions to the flight crew of an aircraft on a forward flight display for purposes of increasing crew situational awareness.

BACKGROUND

Aircraft incidents continue to threaten aviation safety during takeoff, approach, and ground operations. With increasing air traffic and busier than ever airports, managing terminal area traffic both in the air and on the ground safely and efficiently is highly important. Landing, takeoff, and taxiway clearances are typically issued by air traffic control (ATC) via a voice channel in conjunction with airport signs, runway lights, and taxiway lightings and markings. There are several autonomous situational awareness system available today, however due to lack of information, human error, lack of intuitive display, lots of head down time which may lead to hazardous condition in real time.

The most common cause of incidents in aviation is often associated with human errors, or lack of information at the right place. A considerable portion of those incidents can be ascribed to a pilot's involvement in an assortment of simultaneous high workload tasks. With the growth in aviation traffic, one may estimate that these incidents will increase. Pilots often miss the longer ATC messages or pick up the wrong data, for example, a required altitude or heading, for the messages.

In some instances, ATC may issue a conditional clearance to an aircraft. A conditional clearance is a clearance issued by an air traffic controller that does not become effective until a specified condition has been satisfied. Conditional clearance instructions issued by ATC are used to authorize an aircraft to proceed under the particular conditions specified by the air traffic controller. Conditional clearances add efficiency to the control of airspace, as they reduce the total number of voice communications required. Once the condition is met, the corresponding the clearance instruction will be applied to the aircraft. In many cases, a conditional clearance is given in the following order and includes:
 1. Identification;
 2. The condition;
 3. The clearance; and
 4. Brief reiteration of the condition.

ATC typically requires that a conditional clearance be read back in full and in the same sequence as given, plus a brief reiteration of the condition. For example, a typical conditional clearance may be stated as follows: "Aircraft X, after passing altitude 8000 feet, fly heading 120 degrees."

Electronic instrumentation displays continue to advance in sophistication, achieving increasingly higher levels of information density and, consequently, presenting a greater amount of visual information to be perceived and understood by the operator, e.g., the pilot. It is important that visual displays provide a proper cognitive mapping between what the operator is trying to achieve and the information available to accomplish the task. Data driven charts (DDC) have a powerful ability to integrate chart information with aircraft position and flight management system (FMS) procedural routing. This is a very crisp and concise way of presenting information. However, integration of accurate ATC instructions with DDC, particularly conditional clearances, and other information displays such as moving maps and electronic charts, is currently lacking in the art.

Accordingly, there is a need in the art for improved aircraft display methods to further increase aircrew situational awareness when given a conditional clearance. These display methods should provide a visual representation of the conditional clearance that accounts for human factors in processing the conditional clearance. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure generally relates to methods for providing flight displays to the aircrew of an aircraft with the aim of increasing aircrew situational awareness. In one exemplary embodiment, a method for providing a flight display to an aircrew of an ownship aircraft includes the steps of automatically determining a geographical position and an altitude of the ownship aircraft, and receiving, at a radio communications module of the ownship aircraft, a voice transmission on an air traffic control first radio frequency from an air traffic controller, the voice transmission comprising a conditional clearance. The condition clearance comprises a condition instruction and a clearance instruction, wherein the condition instruction is selected from the group consisting of: an altitude condition comprising an altitude value that is either greater or less than the altitude of the ownship aircraft, a position condition comprising a position value configured as a straight-line distance between the geographical position of the ownship aircraft and a navigation waypoint indicated by the position condition, and a time condition comprising a time value configured as a future clock time. The clearance instruction is selected from the group not limited to, but which may consist of a direct-to-waypoint instruction, an altitude instruction, and an air traffic control radio communications instruction.

The method further includes the steps of automatically, and without input from the aircrew, transcribing, using voice recognition software installed on the ownship aircraft, the voice transmission into an electronic, textual format, thereby generating a digital transmission record, automatically, and without input from the aircrew, parsing the digital transmission record to identify the condition instruction and the clearance instruction and to separate the condition instruction from the clearance instruction, and automatically, and without input from the aircrew, displaying, on a display device of the ownship aircraft, the condition instruction using a multi-format symbology and in a multi-step sequence over time.

The multi-step sequence over time is performed as follows: 1) upon parsing the digital transmission record, displaying an initial format condition instruction symbology indicative of a value of the condition instruction being greater than a pre-determined threshold value as follows: for an altitude condition, the difference between the altitude value and the altitude of the ownship aircraft is greater than a pre-determined threshold vertical distance; for a position condition, the position value is greater than a predetermined horizontal distance; and for a time condition, the time between the future clock time and the current clock time is greater than a predetermined amount of time; 2) upon reaching the pre-determined threshold value and after displaying the initial format condition instruction symbology, displaying an threshold format condition instruction symbology, different from the initial format condition instruction symbology, indicative of the value of the condition instruction being equal to the pre-determined threshold value as follows: for an altitude condition, the difference between the altitude value and the altitude of the ownship aircraft is equal to the predetermined threshold vertical distance; for a position condition, the position value is equal to the predetermined horizontal distance; and for a time condition, the time between the future clock time and the current clock time is equal to the predetermined amount of time; and 3) upon reaching the condition value and after displaying the threshold format condition instruction symbology, displaying a condition value format condition instruction symbology, different from either the initial format condition instruction symbology or the threshold format condition instruction symbology, indicative of the value of the condition instruction being equal to a respective one of the altitude of the ownship aircraft, zero distance from the navigation waypoint, or the future clock time as follows: for an altitude condition, zero difference between the attitude value and the altitude of the ownship aircraft; for a position condition, the position value is equal to zero; and for a time condition, zero time between the future clock time and the current clock time.

Still further, the method includes the steps of subsequent to displaying the condition value format condition instruction symbology, waiting for and detecting an aircrew input corresponding to the clearance instruction as follows: for a direct to waypoint instruction, waiting for and detecting an aircrew input causing the ownship aircraft to fly direct to the navigation waypoint; for an altitude instruction, waiting for and detecting an aircrew input causing the ownship aircraft to ascend or descend to the altitude value; and for an air traffic control radio communications instruction, waiting for and detecting an aircrew input causing the radio communications module to change frequencies; and if the aircrew input corresponding to the clearance instruction is detected by the ownship aircraft, performing a further step in the multi-step sequence as follows: 4a) upon detecting the aircrew input corresponding to the clearance instruction, displaying an accepted condition instruction symbology, different from any of the initial format condition instruction symbology, the threshold format condition instruction symbology, or the condition value format condition instruction symbology, indicative of the aircrew having performed the clearance instruction, and thereafter removing the accepted condition instruction symbology from the display device; if, however, the aircrew input corresponding to the clearance instruction is not detected by the ownship aircraft after a waiting period of time, performing a further step in the multi-step sequence as follows: 4b) displaying an alert/missed condition instruction symbology, different from any of the initial format condition instruction symbology, the threshold format condition instruction symbology, the condition value format condition instruction symbology, or the accepted condition instruction symbology, indicative of the aircrew having missed performing the clearance instruction and alerting the aircrew to perform the clearance instruction as soon as possible.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any flight display method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

In accordance with some embodiments, the system and method described in the present disclosure automatically (without intervention from the flight crew) receives, transcribes, and decodes a conditional clearance issued from air traffic. Then, upon concurrence of the conditional clearance between ATC and the flight crew (i.e., read-back of the clearance and acceptance), the condition that is the subject of the conditional clearance will be provided on the primary flight display (PFD) of the aircraft, in order to increase flight crew situational awareness in the cockpit. In some embodiments, the conditional clearance is displayed on the altitude tape of PFD system, and the conditional parameter is provided on the PFD system with a defined symbology and color coding to enhance the visibility of the conditional parameter and increase the monitoring ability to the crew. The described system and method is thus provided to reduce pilot head down time and to increase flight crew efficiency in the cockpit by providing conditional clearance data on a forward view display.

Figure 1:
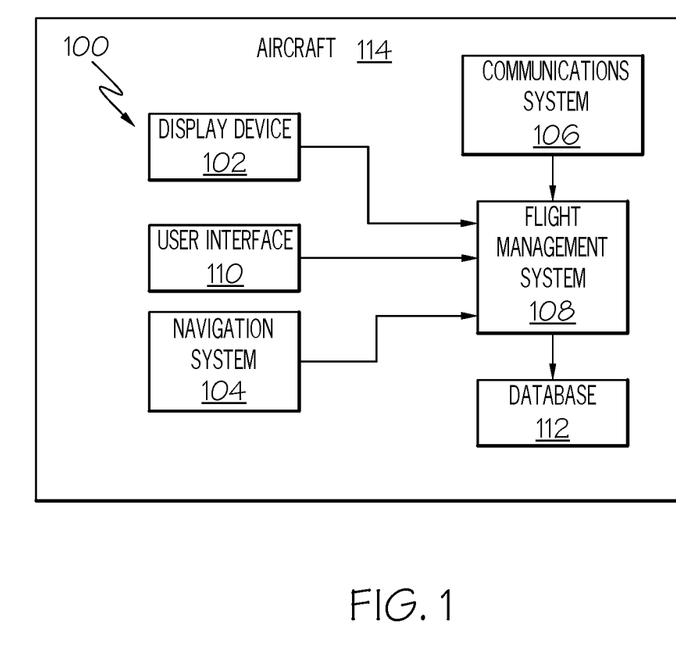
FIG. 1 is a system diagram illustrating an aircraft display system in accordance with the present disclosure.

A first aspect of the present disclosure, therefore, is a system/method for providing a flight display to an aircrew of an ownship aircraft, which is capable of automatically determining a geographical position and an altitude of the ownship aircraft. In particular, FIG. 1 depicts an exemplary embodiment of a display system 100, which may be located onboard ownship aircraft 114. This embodiment of display system 100 may include, without limitation, a display device 102, a navigation system 104, a communications system 106, and a flight management system (FMS) 108. The display system 100 further includes a user interface 110 for enabling interactivity with the display system 100 and a database 112 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 114 will include numerous other devices and components for providing additional functions and features, as will be appreciated in the art.

In an exemplary embodiment, the display device 102 is coupled to the flight management system 108, and the flight management system 108 is configured to display, render, or otherwise convey one or more graphical representations or images associated with operation of the aircraft 114 on the display device 102, as described in greater detail below. The flight management system 108 is coupled to the navigation system 104 for obtaining real-time data and/or information regarding operation of the aircraft 114 to support operation of the flight management system 108, for example including geographical coordinates, altitude, and airspeed, among others. In an exemplary embodiment, the user interface 110 is coupled to the flight management system 108, and the user interface 110 and the flight management system 108 are configured to allow a user to interact with the display device 102 and other elements of display system 100, as described in greater detail below. The communications system 106 is coupled to the flight management system 108 and configured to support communications between the aircraft 114 and another aircraft or ground location (e.g., air traffic control), as will be appreciated in the art. The communications system 106 is configured to transmit and receive signals on multiple discrete frequencies.

In an exemplary embodiment, the display device 102 is realized as an electronic display configured to graphically display flight information or other data associated with operation of the aircraft 114 under control of the flight management system 108, as will be understood. In an exemplary embodiment, the display device 102 is located within a flight deck/cockpit of the aircraft 114. It will be appreciated that although FIG. 1 shows a single display device 102, in practice, additional display devices may be present onboard the aircraft 114. The user interface 110 may also be located within the cockpit of the aircraft 114 and adapted to allow a user (e.g., pilot, co-pilot, or other aircrew member) to interact with the flight management system 108, as described in greater detail below. In various embodiments, the user interface 110 may be realized as a keypad, touchpad, keyboard, mouse, touchscreen, joystick, microphone, or another suitable device adapted to receive input from a user. In an exemplary embodiment, the user interface 110 and flight management system 108 are cooperatively configured to enable a user to indicate, select, or otherwise manipulate one or more pop-up menus displayed on the display device 102, as described below. It should also be appreciated that the display systems under consideration are described as cockpit display systems for exemplary purposes. However, such integrated displays providing clearance information can be made available on mobile or non-primary cockpit display systems like the electronic flight bag (EFB) or even on the non-cockpit display systems.

In an exemplary embodiment, the navigation system 104 is configured to obtain one or more navigational parameters associated with operation of the aircraft 114 (i.e., at least geographical position and altitude). The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the current location of the aircraft 114 (e.g., with reference to a standardized geographical coordinate system) and the heading of the aircraft 114 (i.e., the direction the aircraft is traveling in relative to some reference) and providing these navigational parameters to the flight management system 108.

In an exemplary embodiment, the communications system 106 is configured to support communications between the aircraft 114 and another aircraft or ground location (e.g., air traffic control). In this regard, the communications system 106 may be realized using a radio communication system or another suitable data link system. In accordance with one embodiment, the communications system 106 includes multiple radios configured to be tuned for an identified radio communication frequency, as will be appreciated in the art and described in greater detail below.

In an exemplary embodiment, the flight management system 108 (or, alternatively, a flight management computer) is located onboard the aircraft 114. Although FIG. 1 is a simplified representation of display system 100, in practice, the flight management system 108 may be coupled to one or more additional modules or components as necessary to support navigation, flight planning, and other aircraft control functions in a conventional manner. In addition, the flight management system 108 may include or otherwise access a terrain database, navigational database (that includes airport diagrams, STAR, SID, and en route procedures, for example), geopolitical database, taxi database, or other information for rendering a navigational map or other content on the display device 102, as described below. In this regard, the navigational map may be based on one or more airport diagrams, sectional charts, topographic maps, digital maps, or any other suitable commercial or military database or map, as will be appreciated in the art.

In an exemplary embodiment, the flight management system 108 accesses or includes a database 112 that contains procedure information for a plurality of airports. As used herein, procedure information should be understood as a set of operating parameters or instructions associated with a particular action (e.g., landing, take off, taxiing) that may be undertaken by the aircraft 114 at a particular airport. In this regard, an airport should be understood as referring to a location suitable for landing (or arrival) and/or takeoff (or departure) of an aircraft, such as, for example, airports, runways, landing strips, and other suitable landing and/or departure locations. The database 112 maintains the association of the procedure information and the corresponding airport.

In some embodiments, the display system 100 may be configured as, or to include, a synthetic vision system (SVS). As may be recognized in the art, many aircraft are equipped with one or more vision enhancing systems. Such vision enhancing systems are designed and configured to assist a pilot when flying in conditions that diminish the view from the cockpit. One example of a vision enhancing system is known as a synthetic vision system (hereinafter, "SVS"). As used herein, the term "synthetic vision system" refers to a system that provides computer-generated images of the external scene topography from the perspective of the flight deck, derived from aircraft attitude, high-precision navigation solution, and database of terrain, obstacles, and relevant cultural features. A synthetic vision system is an electronic means to display a synthetic vision depiction of the external scene topography to the flight crew. Synthetic vision creates an image relative to terrain and airport within the limits of the navigation source capabilities (position, altitude, heading, track, and the database limitations). The application of synthetic vision systems is through a primary flight display from the perspective of the flight deck or through a secondary flight display. A typical SVS is configured to work in conjunction with a position determining unit associated with the aircraft as well as dynamic sensors that sense aircraft altitude, heading, and orientation. The SVS includes or accesses a database containing information relating to the topography along the aircraft's flight path, such as information relating to the terrain and known man-made and natural obstacles proximate the aircraft flight path. The SVS receives inputs from the position determining unit indicative of the aircraft location and also receives inputs from the dynamic sensors. The SVS is configured to utilize the position, heading, altitude, and orientation information and the topographical information contained in the database, and generate a three-dimensional image that shows the topographical environment through which the aircraft is flying from the perspective of a person sitting in the cockpit of the aircraft. The three-dimensional image (also referred to herein as an "SVS image") may be displayed to the pilot on any suitable display unit accessible to the pilot. The SVS image includes features that are graphically rendered including, without limitation, a synthetic perspective view of terrain and obstacles located proximate the aircraft's flight path. Using a SVS, the pilot can look at a display screen of the display unit to gain an understanding of the three-dimensional topographical environment through which the aircraft is flying and can also see what lies ahead. The pilot can also look at the display screen to determine aircraft proximity to one or more obstacles proximate the flight path.

In a further aspect of the present disclosure, the disclosed system/method is configured for receiving, at a radio communications module of the ownship aircraft, a voice transmission on an air traffic control first radio frequency from an air traffic controller. In some instances, the voice transmission may include a conditional clearance. As initially noted above, the condition clearance typically includes a condition instruction and a clearance instruction. The condition instruction is typically one or more of: an altitude condition including an altitude value that is either greater or less than the altitude of the ownship aircraft, a position condition including a position value configured as a straight-line distance between the geographical position of the ownship aircraft and a navigation waypoint indicated by the position condition, and/or a time condition including a time value configured as a future clock time. Moreover, the clearance instruction is typically one or more of, but not limited to: a direct-to-waypoint instruction, an altitude instruction, and/or an air traffic control radio communications instruction. Moreover, at the ownship 114, ATC communications may be received by other than voice communications, such as controller-pilot data link communications (CPDLC), as is known in the art.

Figure 2:
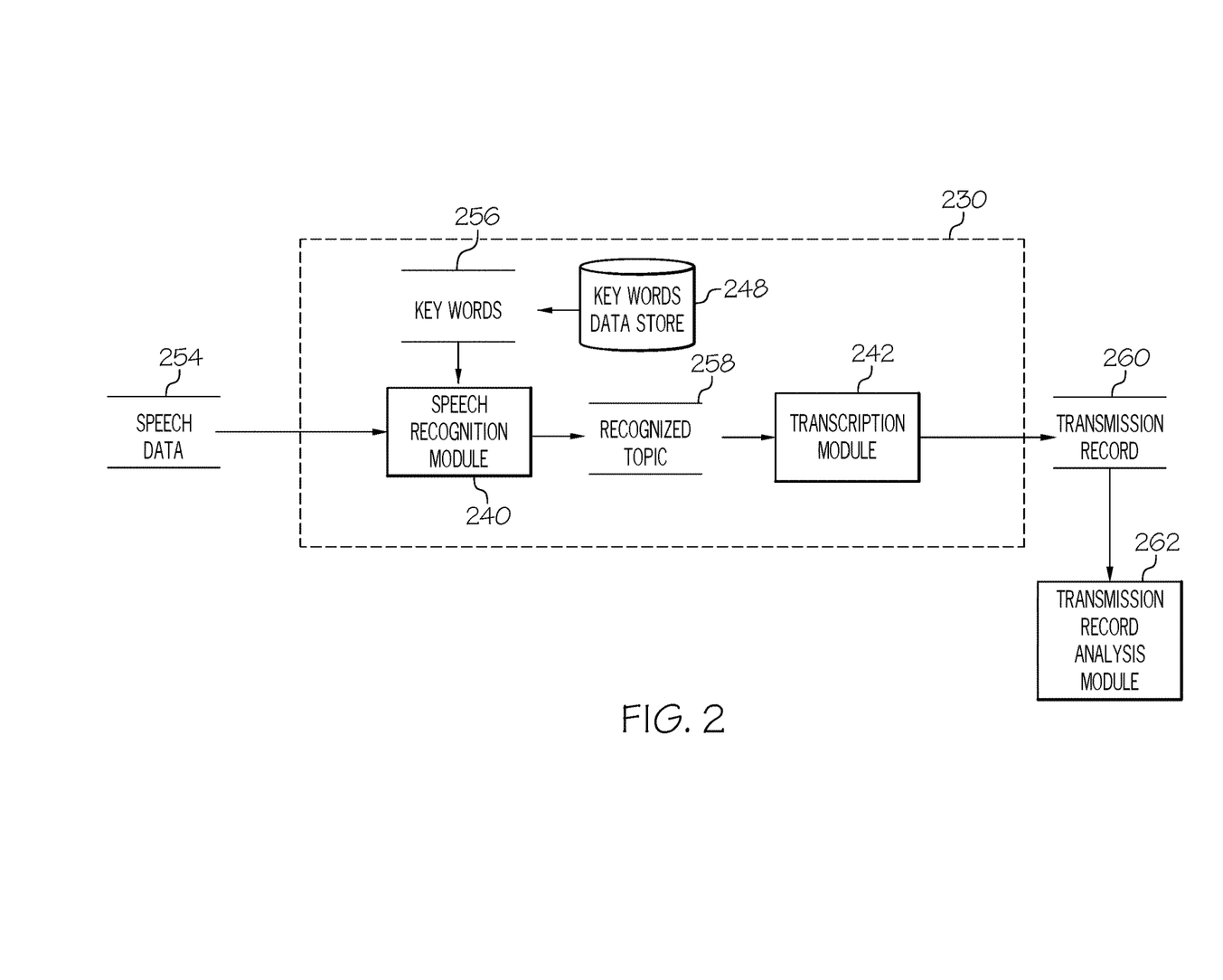
FIG. 2 is a system diagram illustrating a voice recognition system in accordance with the present disclosure.

In a further aspect of the present disclosure, the systems/methods may be configured for automatically, and without input from the aircrew, transcribing, using voice recognition software installed on the ownship aircraft, the voice transmission into an electronic, textual format, thereby generating a digital transmission record. As such, FIG. 2 provides exemplary embodiments of a speech processing system that is configured to receive and process speech input from an ATC communications channel. A speech processing module 230 generally captures and processes speech from the ATC communications channel. Various embodiments of speech processing modules 230 according to the present disclosure may include any number of sub-modules embedded within the speech processing module 230. As can be appreciated, the sub-modules shown in FIG. 2 may be combined and/or further partitioned to process speech. The inputs to the speech processing module 230 may be received from other modules (not shown), determined/modeled by other sub-modules (not shown) within the speech processing module 230, and/or received from the communications system 106. In various embodiments, the speech processing module 230 includes a speech recognition module 240, a speech transcription module 242, and a key words datastore 248.

The speech recognition module 240 receives as input speech data 254 that includes speech spoken by air traffic controllers and that was received at ownship aircraft 114 via communications system 106. The speech recognition module 240 processes the speech data 254 based on one or more speech recognition techniques known in the art to recognize words spoken by ATC. The speech recognition module 240 further processes the recognized words for specific key words 256, or in accordance with various recognized topics 258. In various embodiments, the key words 256 may be learned (e.g., in real time or by processing data offline) and stored in the key words datastore 248. In various embodiments, the key words 256 are words that typically involve conditional clearance instructions issued from ATC to an aircraft, such as taxi clearances, runway crossing clearances, takeoff clearances, landing clearance, and approach clearances. If in fact a key word or words 256 is identified within the speech data 254, a recognized topic 258 (e.g., the one or more sentences containing the key word or words 256) is presented to the speech transcription module 242 for further processing. If, however, no key words are identified in the speech data 254, the speech data 254 and/or the recognized speech may be discarded or logged but need not be further processed. The speech transcription module 242 creates a textual record of the ATC communication, which is produced as transmission record 260.

Thereafter, the systems/methods may be configured for automatically, and without input from the aircrew, parsing the digital transmission record to identify the condition instruction and the clearance instruction and to separate the condition instruction from the clearance instruction. With continued reference to FIG. 2, transmission record 260 is analyzed by transmission record analysis module 262, which identifies the ownship aircraft and any associated conditional clearance instruction that was given to such aircraft. Thus, from each transmission record 260 is deduced a specific conditional clearance pertaining to that aircraft.

In a further aspect of the present disclosure, the systems/methods may be configured for displaying, on a display device of the ownship aircraft, the condition instruction using a multi-format symbology and in a multi-step sequence over time. The multi-step sequence over time may initially include, upon parsing the digital transmission record, displaying an initial format condition instruction symbology indicative of a value of the condition instruction being greater than a pre-determined threshold value as follows: for an altitude condition, the difference between the altitude value and the altitude of the ownship aircraft is greater than a pre-determined threshold vertical distance; for a position condition, the position value is greater than a predetermined horizontal distance; and for a time condition, the time between the future clock time and the current clock time is greater than a predetermined amount of time.

Figure 3:
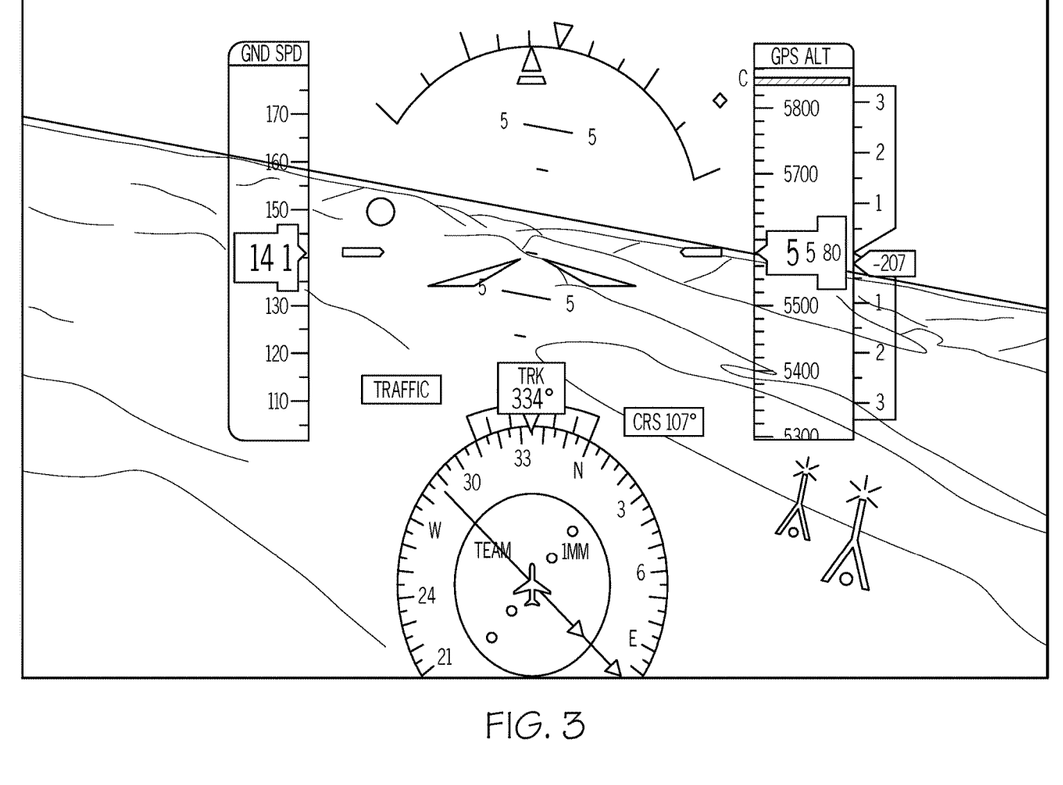
FIGS. 3-6 provide PFD displays for use case with an altitude condition instruction in accordance with some embodiments of the present disclosure.

For example, turning now to FIG. 3, an exemplary PFD image is provided to illustrate certain aspects of the present disclosure. FIG. 3 is based on the following ATC scenario: ATC: "AFTER PASSING ALTITUDE 6000 FEET, PROCEED FOR DIRECT TO [XYZ]." Thus, the condition instruction is understood as passing 6000 feet in altitude, and the clearance instruction is understood as proceeding direct to XYZ. As shown in FIG. 3, the altitude condition instruction may be displayed on the altitude tape of the PFD, with its definition (indication) of priority and criticality of data using various human factor considerations (e.g., color coding). Thus, after ATC transcription has occurred as described above, the message will be identified as a conditional clearance message, and once the flight crew acknowledges the message, then the decoded condition instruction/parameter will be passed through the FMS to process the display rendering on the PFD, in the initial formal, which typically may be a first color, such as green. Thus, as shown in FIG. 3, the PFD indicates a "C"—conditional clearance of 6000 feet that is displayed on the altitude tape, with a green line. Once the aircraft reaches the particular altitude, the respective clearance instruction will be valid to load into the avionics system.

Figure 4:
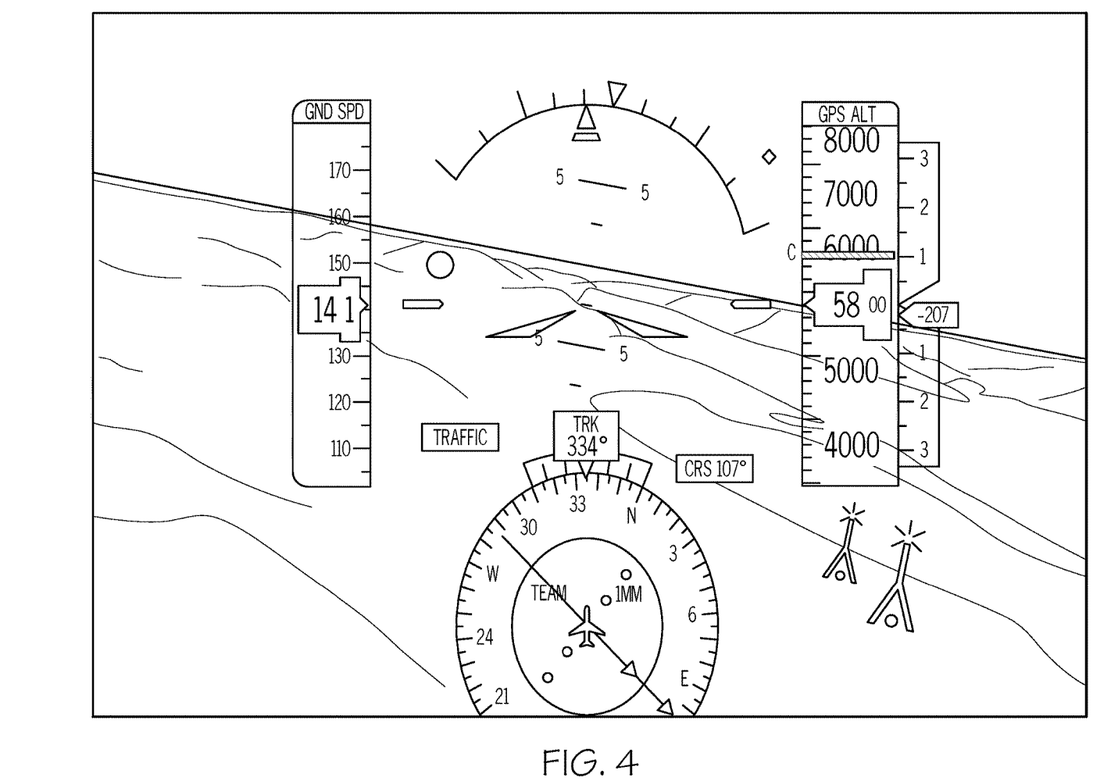

Turning now to FIG. 4, and with further reference to the multi-step sequence over time, upon reaching the pre-determined threshold value and after displaying the initial format condition instruction symbology, displaying an threshold format condition instruction symbology, different from the initial format condition instruction symbology, indicative of the value of the condition instruction being equal to the pre-determined threshold value as follows: for an altitude condition, the difference between the altitude value and the altitude of the ownship aircraft is equal to the predetermined threshold vertical distance; for a position condition, the position value is equal to the predetermined horizontal distance; and for a time condition, the time between the future clock time and the current clock time is equal to the predetermined amount of time. The threshold format symbology may involve the use of a different color, such as yellow. Thus, as shown in FIG. 4, when the condition is near to being met (such as within a few hundred feet of the condition instruction altitude), the PFD which depicts a "C"—conditional clearance of 6000 feet, the now yellow line provides a change in the alerting to the flight crew. In this way, the change in symbology, e.g. the change in color in this example, provides the flight crew an advance indication that the condition is about to be met.

Figure 5:
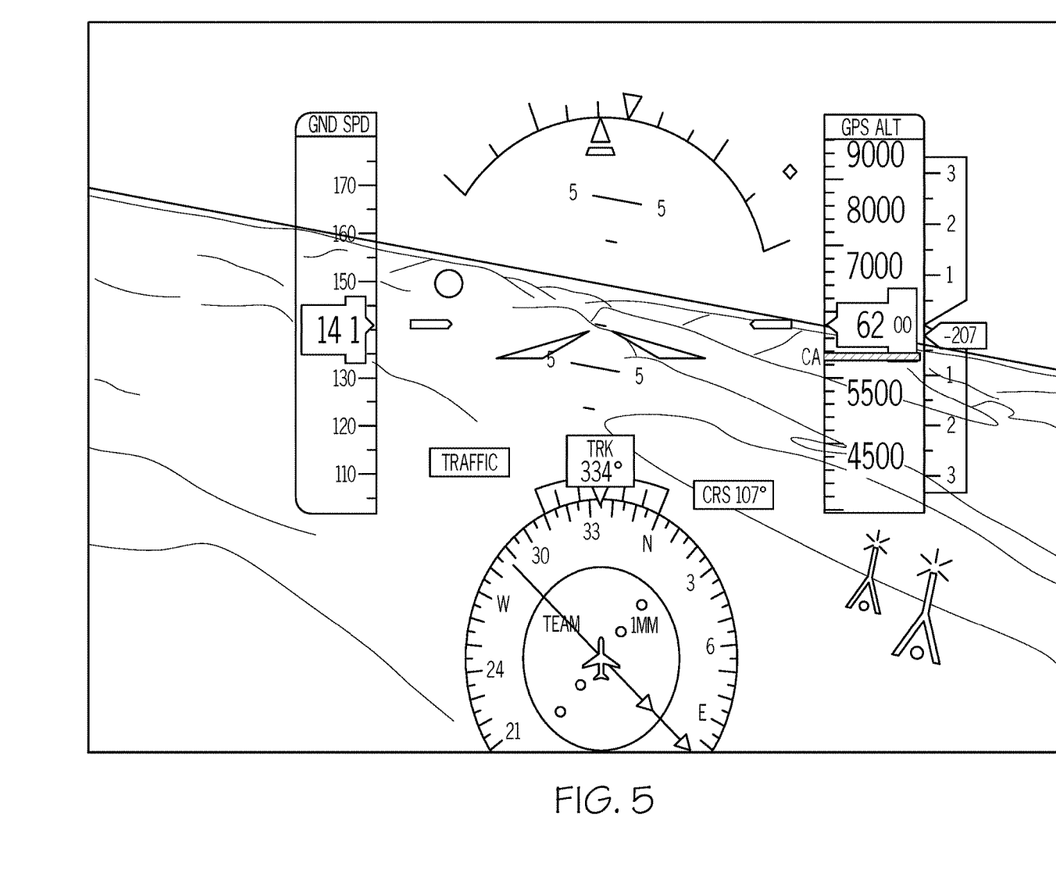

Turning now to FIG. 5, and with further reference to the multi-step sequence over time, the system/method may be configured for, upon reaching the condition value and after displaying the threshold format condition instruction symbology, displaying a condition value format condition instruction symbology, different from either the initial format condition instruction symbology or the threshold format condition instruction symbology, indicative of the value of the condition instruction being equal to a respective one of the altitude of the ownship aircraft, zero distance from the navigation waypoint, or the future clock time as follows: for an altitude condition, zero difference between the altitude value and the altitude of the ownship aircraft; for a position condition, the position value is equal to zero; and for a time condition, zero time between the future clock time and the current clock time. Thus, once the condition is met, the flight crew will want to take any necessary action (based on the conditional clearance message) regarding the clearance instruction, and to apply the changes in the ownship avionics. As shown in FIG. 5, the flight crew took the necessary clearance information (e.g., direct to XYZ clearance message associated with ATC instruction), then the PFD displays an "accepted" symbology, "CA"—condition accepted. The symbology may be displayed with the green color.

With continued reference to the multi-step sequence, subsequent to displaying the condition value format condition instruction symbology, the system/method may be configured for waiting for and detecting an aircrew input corresponding to the clearance instruction as follows, but which are not limited to: for a direct to waypoint instruction, waiting for and detecting an aircrew input causing the ownship aircraft to fly direct to the navigation waypoint; for an altitude instruction, waiting for and detecting an aircrew input causing the ownship aircraft to ascend or descend to the altitude value; and for an air traffic control radio communications instruction, waiting for and detecting an aircrew input causing the radio communications module to change frequencies. If the aircrew input corresponding to the clearance instruction is detected by the ownship aircraft, the system/method is configured for performing a further step in the multi-step sequence as follows: upon detecting the aircrew input corresponding to the clearance instruction, displaying an accepted condition instruction symbology, different from any of the initial format condition instruction symbology, the threshold format condition instruction symbology, or the condition value format condition instruction symbology, indicative of the aircrew having performed the clearance instruction, and thereafter removing the accepted condition instruction symbology from the display device. if, however, the aircrew input corresponding to the clearance instruction is not detected by the ownship aircraft after a waiting period of time, the system/method is configured for performing a further step in the multi-step sequence as follows: displaying an alert/missed condition instruction symbology, different from any of the initial format condition instruction symbology, the threshold format condition instruction symbology, the condition value format condition instruction symbology, or the accepted condition instruction symbology, indicative of the aircrew having missed performing the clearance instruction and alerting the aircrew to perform the clearance instruction as soon as possible.

Figure 6:
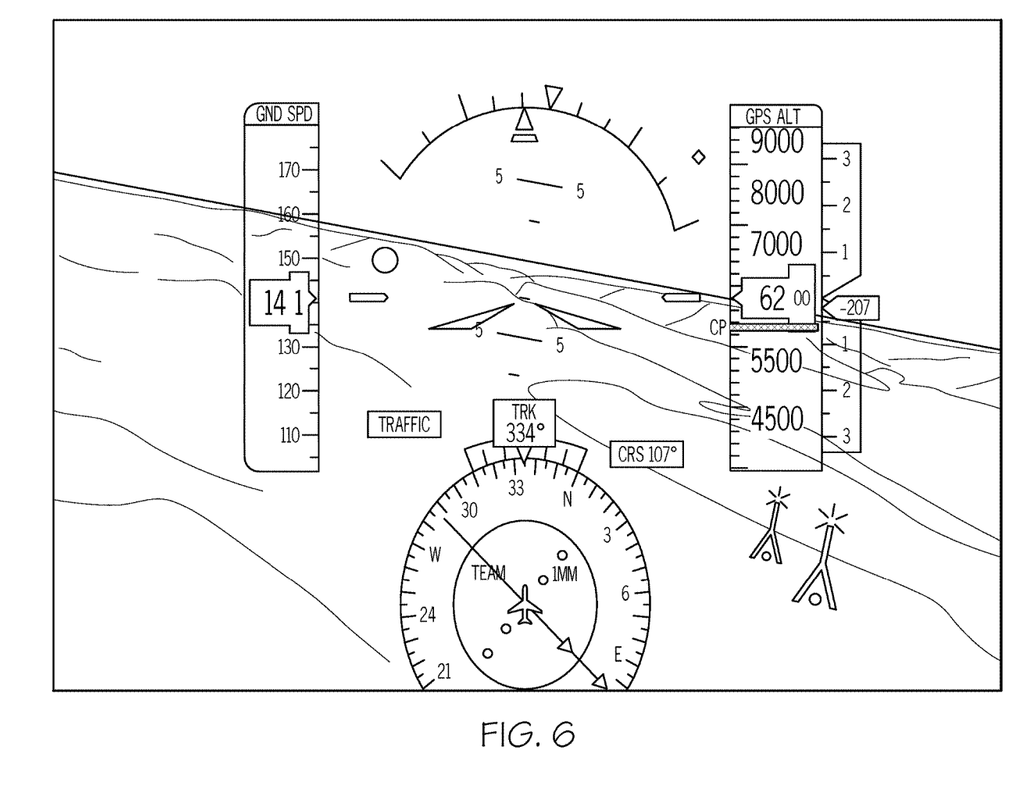

Referring to FIG. 6, assume that after the condition is met (from FIG. 5), the flight crew did not initiate the clearance instruction that was accepted during the communication with ATC. For this situation, the PFD may display symbology indicative of the condition being passed, with an appropriate color code, such as red, which gives an indication to the flight crew that the required action has not been performed. The indication "CP"—condition pending may then be displayed on PFD, for purposes of giving situational awareness to the flight crew to better understand the pending action.

Figure 7:
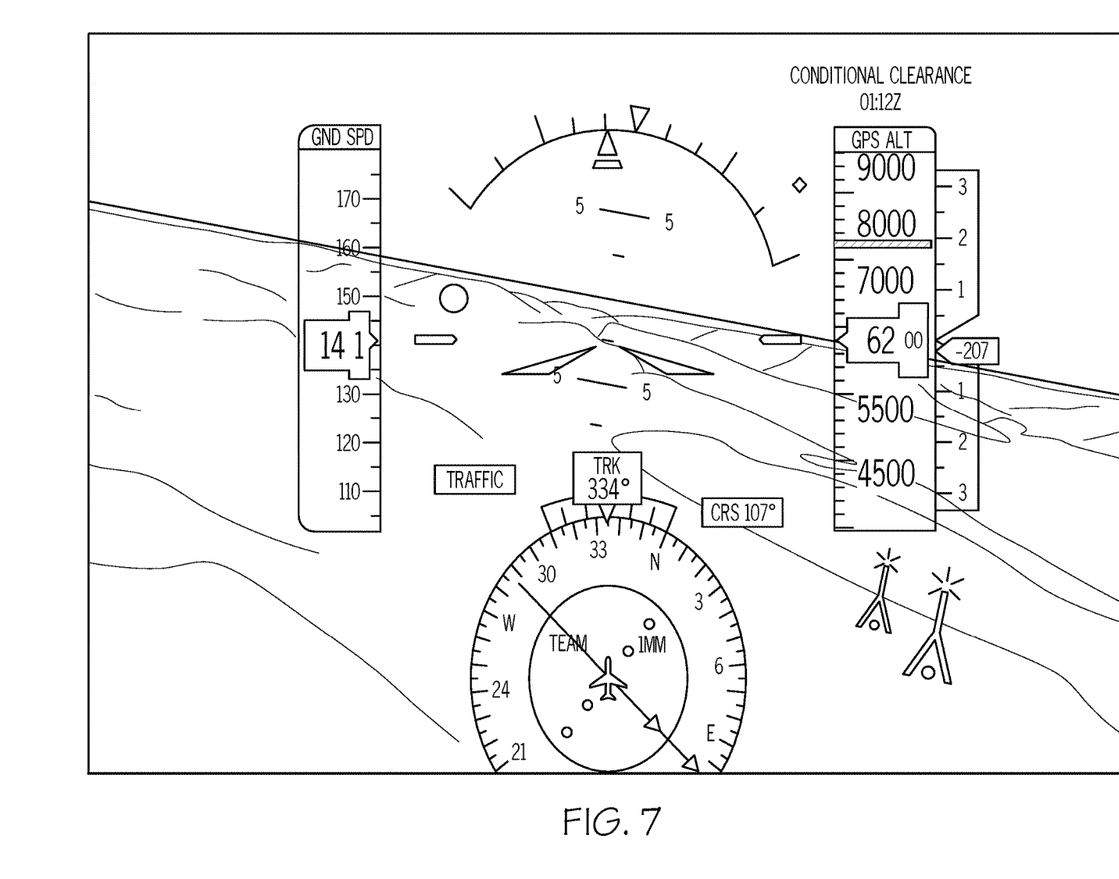
FIG. 7 provides a PFD display for a use case with a position crossing condition instruction.
Figure 8:
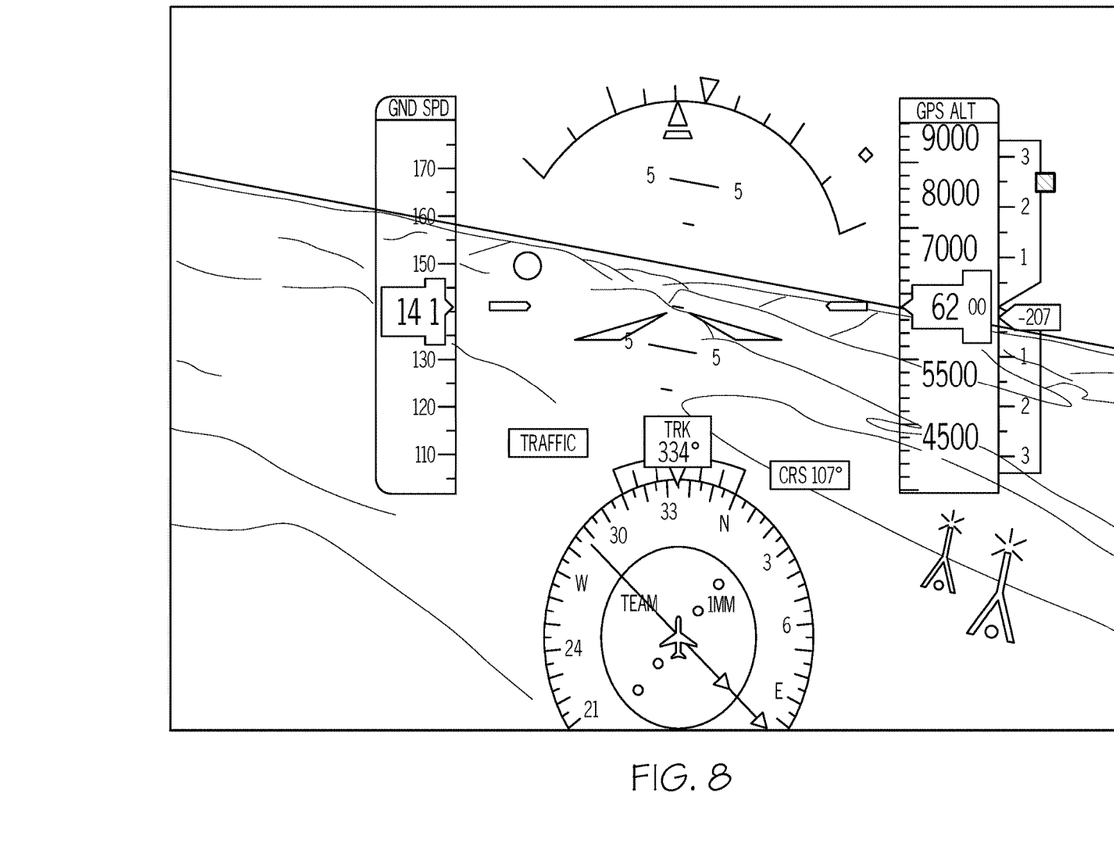
FIG. 8 provides a PFD display for a use case with a time condition instruction.

FIGS. 7 and 8 provide exemplary displays for position crossing and time condition instructions, respectively. For FIG. 7: ATC: "AFTER CROSSING POSITION XYZ, MAINTAIN ALTITUDE OF 10000 FEET." Thus, the condition instruction is crossing XYZ, and the clearance instruction is to maintain altitude 10,000 feet. As shown, the condition, while pending, can be displayed in a green textual formal above the altitude tape, and a line may also be provided indicative of the time remaining until the crossing location is reached. For FIG. 8: ATC: "AT TIME 1212z, CONTACT ATC FREQUENCY 123.95 Hz." Here, the condition instruction is time 1212z, and the clearance instruction is to contact a particular controller on a particular frequency. The condition may be shown as with a time pending symbology.

Figure 9:
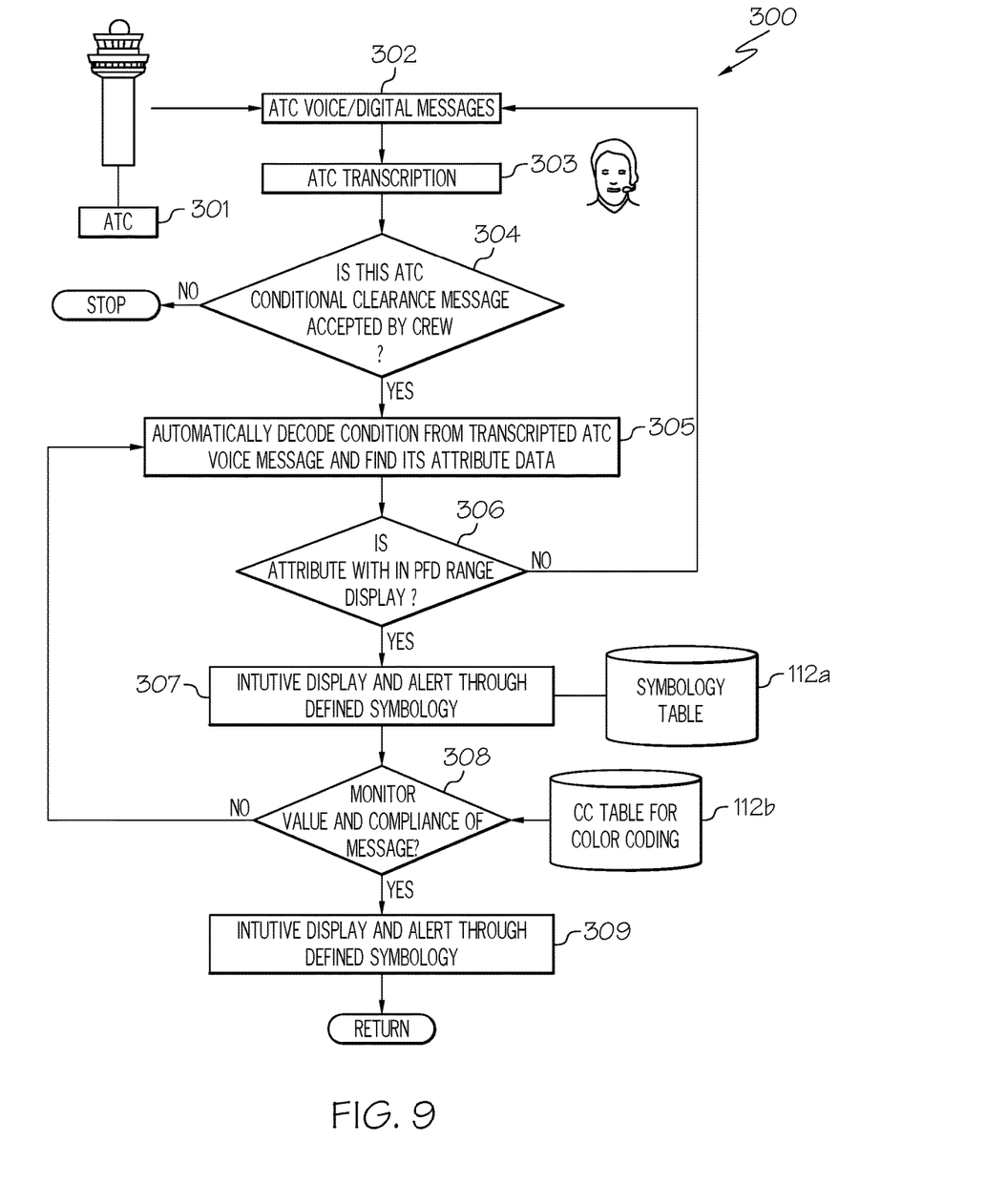
FIG. 9 is a method flowchart for providing a flight display for conditional ATC clearances in accordance with embodiments of the present disclosure.

Reference is now made to FIG. 9, which is a method flowchart 300 for providing a flight display for conditional ATC clearances in accordance with embodiments of the present disclosure. At step 301, ATC provides a conditional clearance instruction to the ownship aircraft. At step 302, the ATC message is received at the ownship aircraft. At step 303, the ownship aircraft automatically transcribes the conditional clearance instruction. At step 304, the flight crew is given the opportunity to accept the conditional clearance instruction. At step 305, the transcribed message is decoded. At step 306, it is determined if the condition is within range to be displayed on the PFD. At step 307, the condition is displayed using the symbology discussed above with regard to FIGS. 3-8. Moreover, at step 308, the condition is monitored over time. In connection therewith, at step 309, the symbology may change according to FIGS. 3-8, as discussed above.

As such, the present disclosure has provided PFD display systems/methods that decode conditional clearance instructions from an ATC transcription and render the required condition parameter on display system. The decoded condition parameter is displayed on the altitude tape for example (in case of an altitude condition), and is depicted with a "C", "CA", or "CP" and a symbol bar, with variable color coding, indicating the conditional clearance attribute. Intuitive rendering with color code permits the display to differ based on the nearing condition, which will enhance the situational awareness of the flight crew regarding the conditional clearance, i.e. if it less than 500 feet to reach the condition, then the green bar will be changed to yellow indicating the nearing condition. If the condition is passed, if required action is not being performed, then the attribute data will be displayed with red color indicating the action is not performed by the crew. Displaying the critical data in forward view will enhance the crew visibility and knowledge. The described systems/methods thus serve to provide improved aircraft display methods to further increase aircrew situational awareness when given a conditional clearance. These display methods provide a visual representation of the conditional clearance that accounts for human factors in processing the conditional clearance.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing a flight display to an aircrew of an ownship aircraft, the method comprising the steps of:
   automatically determining a geographical position and an altitude of the ownship aircraft;
   receiving, at a radio communications module of the ownship aircraft, a voice transmission on an air traffic control first radio frequency from an air traffic controller, the voice transmission comprising a conditional clearance, wherein the conditional clearance comprises a condition instruction and a clearance instruction;
   automatically, and without input from the aircrew, identifying the condition instruction and the clearance instruction from the voice transmission by automatically, and without input from the aircrew, transcribing, using voice recognition software installed on the ownship aircraft, the voice transmission into an electronic format, thereby generating a digital transmission record; and automatically, and without input from the aircrew, parsing the digital transmission record to identify the condition instruction and the clearance instruction;
   automatically, and without input from the aircrew, displaying, on a display device of the ownship aircraft, the condition instruction using a multi-format symbology and in a multi-step sequence over time, wherein the multi-step sequence over time is performed as follows:
   1) upon parsing the digital transmission record, displaying an initial format condition instruction symbology, with criticality level comprising a color code mechanism indicative of a value of the condition instruction being greater than a pre- determined threshold value;
   2) upon reaching the pre-determined threshold value and after displaying the initial format condition instruction symbology, displaying a threshold format condition instruction symbology, different from the initial format condition instruction symbology, with criticality level comprising a color code mechanism indicative of the value of the condition instruction being equal to the pre-determined threshold value;
   3) upon reaching the condition value and after displaying the threshold format condition instruction symbology, displaying a condition value format condition instruction symbology, different from either the initial format condition instruction symbology or the threshold format condition instruction symbology, with criticality level comprising a color code mechanism indicative of the value of the condition instruction being equal to an ownship aircraft value; subsequent to displaying the condition value format condition instruction symbology, waiting for and detecting an aircrew input corresponding to the clearance instruction; and if the aircrew input corresponding to the clearance instruction is detected by the ownship aircraft, performing a further step in the multi-step sequence as follows:
   4a) upon detecting the aircrew input corresponding to the clearance instruction, displaying an accepted condition instruction symbology, different from any of the initial format condition instruction symbology, the threshold format condition instruction symbology, or the condition value format condition instruction symbology, with criticality level comprising a color code mechanism indicative of the aircrew having performed the clearance instruction, and thereafter removing the accepted condition instruction symbology from the display device, if, however, the aircrew input corresponding to the clearance instruction is not detected by the ownship aircraft after a waiting period of time, performing a further step in the multi-step sequence as follows:
   4b) displaying an alert/missed condition instruction symbology, different from any of the initial format condition instruction symbology, the threshold format condition instruction symbology, the condition value format condition instruction symbology, or the accepted condition instruction symbology, with criticality level comprising a color code mechanism indicative of the aircrew having missed performing the clearance instruction and alerting the aircrew to perform the clearance instruction as soon as possible.

2. The method of claim 1, wherein the step of automatically determining the geographical position and the altitude of the ownship aircraft is performed by a flight management system (FMS) of the ownship aircraft.

3. The method of claim 1, wherein the condition instruction is selected from the group consisting of: an altitude condition comprising an altitude value that is either greater or less than the altitude of the ownship aircraft, a position condition comprising a position value configured as a straight-line distance between the geographical position of the ownship aircraft and a navigation waypoint indicated by the position condition, and a time condition comprising a time value configured as a future clock time.

4. The method of claim 3, wherein the initial format condition instruction symbology is displayed when: for an altitude condition, the difference between the altitude value and the altitude of the ownship aircraft is greater than a pre-determined threshold vertical distance; for a position condition, the position value is greater than a predetermined horizontal distance; and for a time condition, the time between the future clock time and the current clock time is greater than a predetermined amount of time.

5. The method of claim 3, wherein the threshold format condition instruction symbology is displayed when: for an altitude condition, the difference between the altitude value and the altitude of the ownship aircraft is equal to the predetermined threshold vertical distance; for a position condition, the position value is equal to the predetermined horizontal distance; and for a time condition, the time between the future clock time and the current clock time is equal to the predetermined amount of time.

6. The method of claim 3, wherein the condition value format condition instruction symbology is displayed when: for an altitude condition, zero difference between the attitude value and the altitude of the ownship aircraft; for a position condition, the position value is equal to zero; and for a time condition, zero time between the future clock time and the current clock time.

7. The method of claim 1, wherein the clearance instruction is selected from the group consisting of: a direct-to-waypoint instruction, an altitude instruction, and an air traffic control radio communications instruction.

8. The method of claim 7, wherein the step of waiting for and detecting the aircrew input corresponding to the clearance instruction comprises: for a direct to waypoint instruction, waiting for and detecting an aircrew input causing the ownship aircraft to fly direct to the navigation waypoint; for an altitude instruction, waiting for and detecting an aircrew input causing the ownship aircraft to ascend or descend to the altitude value; and for an air traffic control radio communications instruction, waiting for and detecting an aircrew input causing the radio communications module to change frequencies.

9. The method of claim 1, wherein the multi-format symbology comprises the symbols "C", "CP", and "CA" representing Conditional Clearance, Condition Pending, and Condition Accepted, respectively.

* * * * *